(12) United States Patent
Lane

(10) Patent No.: US 7,571,920 B2
(45) Date of Patent: Aug. 11, 2009

(54) BICYCLE FRONT FORK ASSEMBLY

(75) Inventor: Timothy Saul Lane, Irvine, CA (US)

(73) Assignee: Felt Racing, LLC, Irvine, CA (US)

( * ) Notice: Subject to any disclaimer, the term of this patent is extended or adjusted under 35 U.S.C. 154(b) by 208 days.

(21) Appl. No.: 11/595,205

(22) Filed: Nov. 10, 2006

(65) Prior Publication Data

US 2008/0073870 A1 Mar. 27, 2008

Related U.S. Application Data

(60) Provisional application No. 60/826,516, filed on Sep. 21, 2006.

(51) Int. Cl.
*B62K 21/02* (2006.01)
(52) U.S. Cl. .................. 280/279; 280/274; 74/551.8
(58) Field of Classification Search .............. 29/700; 74/551.1, 551.3, 551.8; 180/219, 223; 280/275–280, 280/274
See application file for complete search history.

(56) References Cited

U.S. PATENT DOCUMENTS

| | | | |
|---|---|---|---|
| 371,266 A | 10/1887 | Knous | |
| 400,074 A | 3/1889 | Gendron | |
| 2,687,898 A | 8/1954 | Schwinn | |
| 2,756,070 A | 7/1956 | Torre | |
| 4,008,903 A | 2/1977 | Ramond | |
| 4,189,167 A | 2/1980 | Dubois | |
| 4,854,844 A * | 8/1989 | Carlsen | 425/141 |
| 4,939,950 A | 7/1990 | Girvin | |
| 5,039,470 A | 8/1991 | Bezin | |
| 5,044,656 A | 9/1991 | Peyre | |
| 5,065,633 A | 11/1991 | Mercat | |
| 5,085,063 A * | 2/1992 | Van Dyke et al. | 70/218 |
| 5,181,732 A | 1/1993 | Bezin | |
| 5,188,384 A | 2/1993 | van Raemdonck | |
| 5,190,308 A | 3/1993 | Couturet et al. | |
| 5,271,784 A * | 12/1993 | Chen et al. | 156/156 |
| 5,429,381 A * | 7/1995 | Mercat et al. | 280/279 |
| 5,540,457 A * | 7/1996 | Johnson | 280/279 |
| 5,826,898 A * | 10/1998 | Fortier et al. | 280/279 |

(Continued)

FOREIGN PATENT DOCUMENTS

DE 9415070 11/1994

(Continued)

*Primary Examiner*—Anne Marie M Boehler
*Assistant Examiner*—Levon J Fiore
(74) *Attorney, Agent, or Firm*—Stetina Brunda Garred & Brucker

(57) ABSTRACT

A bicycle front end assembly is provided which is configured to reduce aerodynamic drag. In particular, an axis shaft of a fork may be mounted to a head tube of a bicycle frame. A fork head may be disposed in front of the head tube for providing a front end assembly which is aerodynamically configured while providing an increased moment of inertia compared with traditional designs to reduce drag of the bicycle and increase steering stiffness. Also, the handlebar may be attached to the fork head such that when the bicycle is steered to the left, the fork head is rotated toward the left and when the bicycle is steered to the right, the fork head is rotated toward the right. In this manner, the fork head is alignable to the travel direction of the bicycle.

15 Claims, 10 Drawing Sheets

U.S. PATENT DOCUMENTS

| | | | |
|---|---|---|---|
| 6,234,506 B1 * | 5/2001 | Li | 280/280 |
| 6,254,115 B1 * | 7/2001 | Lin | 280/279 |
| 6,264,284 B1 * | 7/2001 | Lees | 411/431 |
| 6,669,219 B2 | 12/2003 | Turner et al. | |
| 6,711,966 B2 * | 3/2004 | Chuang | 74/551.8 |
| 6,805,373 B2 | 10/2004 | Singenberger et al. | |
| 6,889,992 B2 | 5/2005 | Vroomen et al. | |
| 7,000,936 B2 | 2/2006 | Schmider | |
| 7,104,562 B2 | 9/2006 | Schmider et al. | |
| 2002/0033586 A1 | 3/2002 | Vroomen et al. | |
| 2005/0109152 A1 * | 5/2005 | Hsu | 74/551.3 |
| 2008/0035431 A1 | 2/2008 | Vroomen et al. | |
| 2008/0036170 A1 | 2/2008 | Vroomen et al. | |
| 2008/0036171 A1 | 2/2008 | Vroomen et al. | |
| 2008/0054592 A1 | 3/2008 | Vroomen et al. | |
| 2008/0054593 A1 | 3/2008 | Vroomen et al. | |

FOREIGN PATENT DOCUMENTS

| | | |
|---|---|---|
| DE | 4423116 | 2/1995 |
| DE | 20206195 | 8/2002 |
| DE | 20206196 | 9/2002 |
| EP | 1612134 | 1/2006 |

* cited by examiner

BICYCLE FRONT FORK ASSEMBLY

CROSS-REFERENCE TO RELATED APPLICATIONS

This application claims the benefit of U.S. Provisional Patent Application No. 60/826,516, filed on Sep. 21, 2006, the entire contents of which is incorporated herein by reference.

STATEMENT RE: FEDERALLY SPONSORED RESEARCH/DEVELOPMENT

Not Applicable

BACKGROUND

The present invention is related to a bicycle front end assembly, and more particularly, to an aerodynamically shaped front end of the bicycle.

In prior art bicycles, the fork and handlebar are attached to a head tube of the bicycle frame via a threaded headset (see FIG. 1) or a non-threaded headset (see FIG. 2). In relation to threaded headsets, the fork may comprise a steerer shaft which protrudes upwardly from a fork crown which joins fork legs. The steerer shaft is sized and configured to be received within the head tube of the frame. A lower bearing is interposed between the lower end portion of the head tube and the fork crown. Also, an upper bearing is interposed between the upper end portion of the head tube and an upper cone or cup which is attached to the upper end portion of the head tube. The upper and lower bearings allow the fork to pivot about the head tube of the bicycle frame.

The handlebar stem is inserted into the steerer shaft. The handlebar stem has a lower quill that frictionally engages the wedge. The handlebar stem and the steerer shaft are engaged to each other via a compression bolt. The compression bolt is insertable through the handlebar stem and threadably engagable to an internal thread of the quill. The compression bolt expands the quill and wedge to fixedly attach the handlebar stem and fork. After the handlebar stem is attached to the steerer shaft, the handlebar is attached to the handlebar stem.

In a threadless system, the steerer shaft is sufficiently long so as to protrude through the upper end of the head tube. The lower bearing is disposed between the fork crown and the lower end portion of the head tube. The upper bearing is disposed between upper end portion of the head tube carrying an upper cone or cup. The handlebar stem is directly attached to the upper end portion of the steerer shaft. The handlebar is then attached to the steerer shaft.

As you will note in the prior art, the handlebar/handlebar stem is always directly attached to or is supported by the steerer shaft which extends through the head tube of the bicycle frame. Such configuration is not optimal in the structural and aerodynamic sense because the load bearing steerer shaft must be sized smaller than the bore through the frame such that it can rotate freely.

The frontal area of a bicycle contributes to the amount of aerodynamic drag that a cyclist experiences. The bicycle front end is the initial part of the bicycle/rider unit that slices through the air. On one hand, if the bicycle front end slices through the air efficiently, then the amount of drag that the cyclist would have to overcome is reduced. On the other hand, if the bicycle front end slices through the air inefficiently, then the amount of drag that the cyclist would have to overcome is increased.

In bicycle sport racing, it is advantageous to reduce the amount of drag because less drag equates to a faster race time. The front end assembly of prior art bicycles is prone to drag due to the discontinuous shape thereof and the fact that the frame's head tube must be necessarily have a larger frontal area than is required to fit the fork steerer shaft, which bears the steering loads, into the head tube. Preferably, the steerer shaft is very stiff in torsion and bending. This can be achieved by increasing the moment of inertia of said steerer shaft. Accordingly, there is a need in the art for a more aerodynamically shaped bicycle front end assembly.

BRIEF SUMMARY

The present invention addresses the deficiencies identified above, discussed below and those that are known in the art.

The bicycle front end may comprise a fork. The fork may have fork legs which are attached to a front wheel. The fork legs may be joined to each other at a fork crown. An axis shaft and a fork head may be attached to the fork crown. The axis shaft defines a fork rotational axis. The fork head is disposed in front of a head tube of the bicycle frame when the fork is mounted to the bicycle frame. When the fork is rotated to maneuver the bicycle, the fork head is also rotated toward the travel direction of the bicycle. In this regard, the fork head assists in reducing drag despite the travel direction of the bicycle.

The axis shaft may be used to mount the fork to the head tube of the bicycle frame, whereas, the fork head may be used to mount the handlebar for steering the bicycle. In particular, a lower bearing may be disposed between the fork crown and the lower end portion of the head tube when the axis shaft is inserted into the head tube. An upper bearing may be disposed between the upper end portion of the head tube and a headset cap. The headset cap may be threaded onto external threads formed on the upper distal end portion of the axis shaft. The headset cap may be tightened onto the axis shaft to compress the headset cap, head tube, upper and lower bearings, and fork together until a fork rotational axis is aligned to a central axis of the head tube, the fork does not wobble and is able to freely rotate with respect to the head tube of the bicycle frame. After the headset cap is tightened onto the axis shaft, the headset cap is fixed to the axis shaft via a headset locking screw, pin, or other method.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
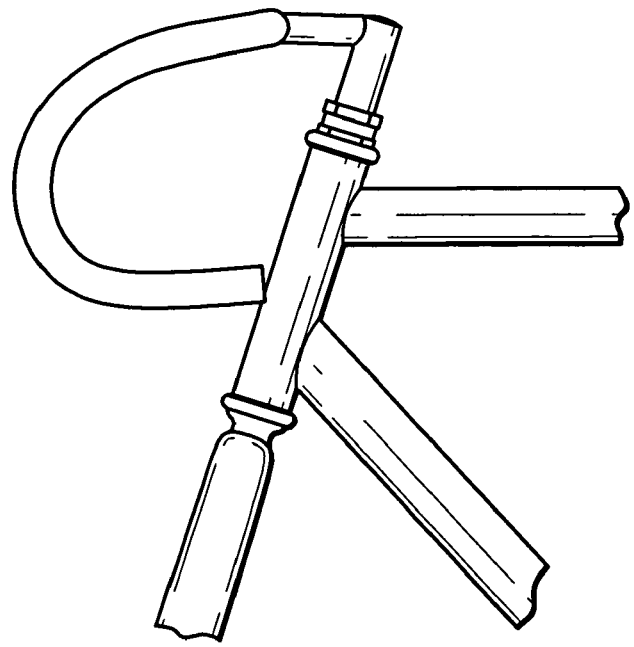
FIG. 1 is a side view of a prior art threaded headset of a bicycle wherein a handlebar is directly mounted to a steerer shaft of a fork.
Figure 2:
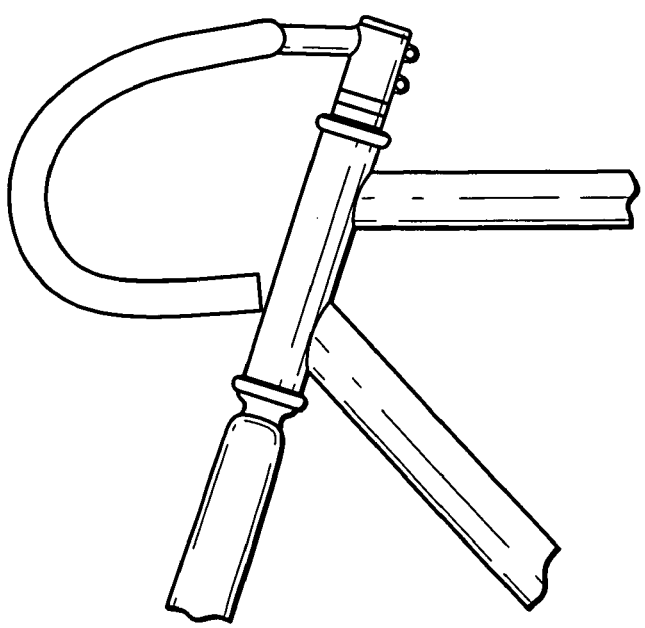
FIG. 2 is a side view of a prior art threadless headset of a bicycle wherein the handlebar is also directly mounted to the steerer shaft of the fork.
Figure 3:
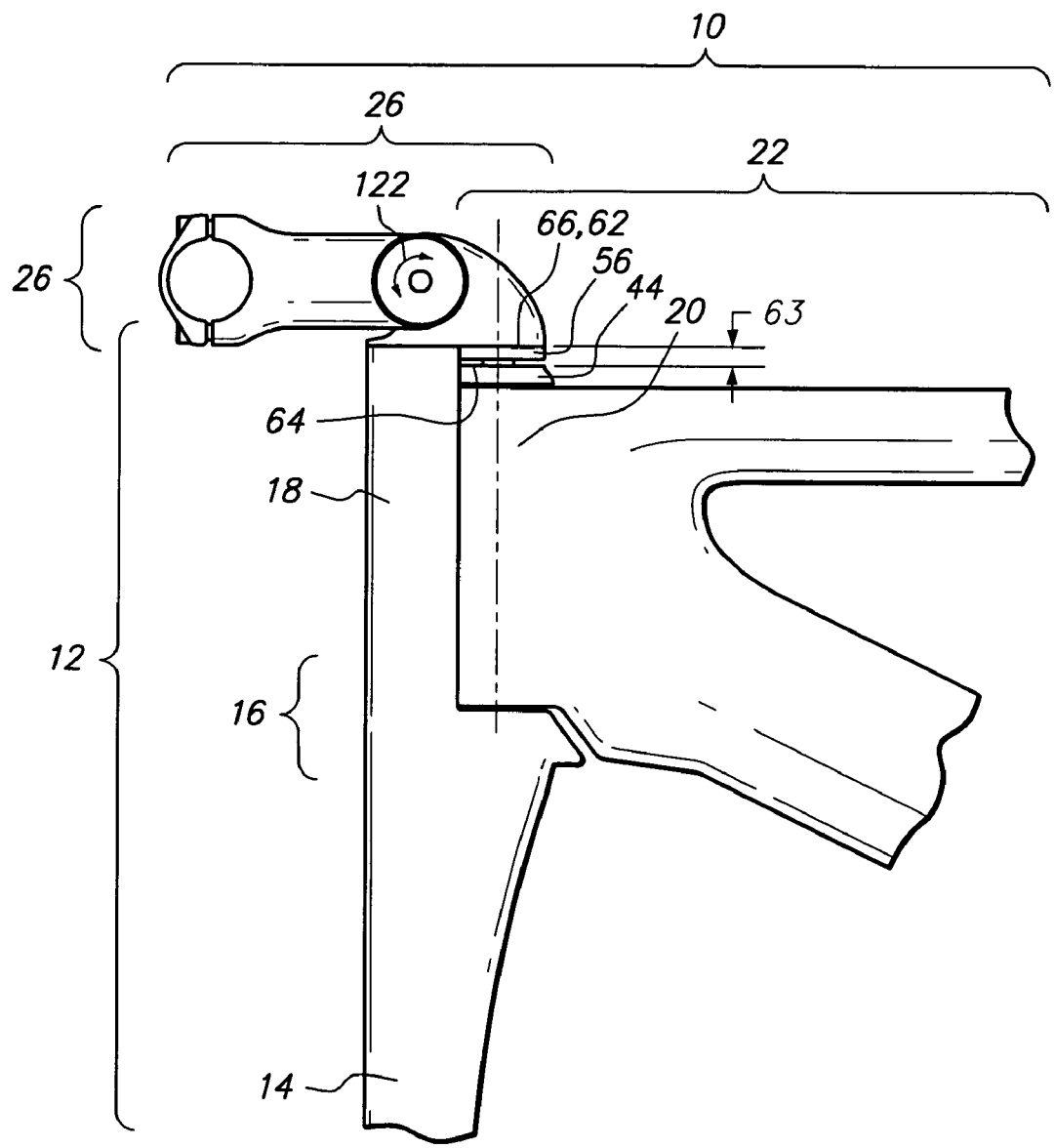
FIG. 3 is an assembled side view of a bicycle wherein an axis shaft of the fork is mounted to a head tube of a bicycle frame and a handlebar is separably mounted to a fork head attached to the fork.

Referring now to FIG. 3, a side assembled view of a bicycle 10 is shown. The bicycle 10 is shown as having a fork 12. The fork 12 has fork legs 14 which extend upward and are joined together at a fork crown 16. A fork head 18 is extended upward in front of a head tube 20 of a bicycle frame 22 for providing an aerodynamically configured bicycle front end compared to prior art threaded headsets (see FIG. 1) and prior art threadless headsets (see FIG. 2). Additionally, the fork head 18 also is a structural support for a handlebar. In particular, the handlebar may be attached to the fork head via a handlebar mount 26. Rotation of the handlebar about the steering axis rotates the fork head 18 and the fork 12 relative to the bicycle frame 22.

In use, the fork head 18 is correspondingly aligned about the head tube 20 of the frame 22 to the riding direction of the bicycle 10. Such corresponding alignment of the fork head 18 with the steering direction of the bicycle 10 allows the fork head 18 to behave as a means for reducing the drag on the bicycle 10. For example, the fork head 18 remains aligned to the travel path of the bicycle 10. If the bicycle 10 is traveling to the left, then the fork head 18 is pointed to the left.

Figure 4:
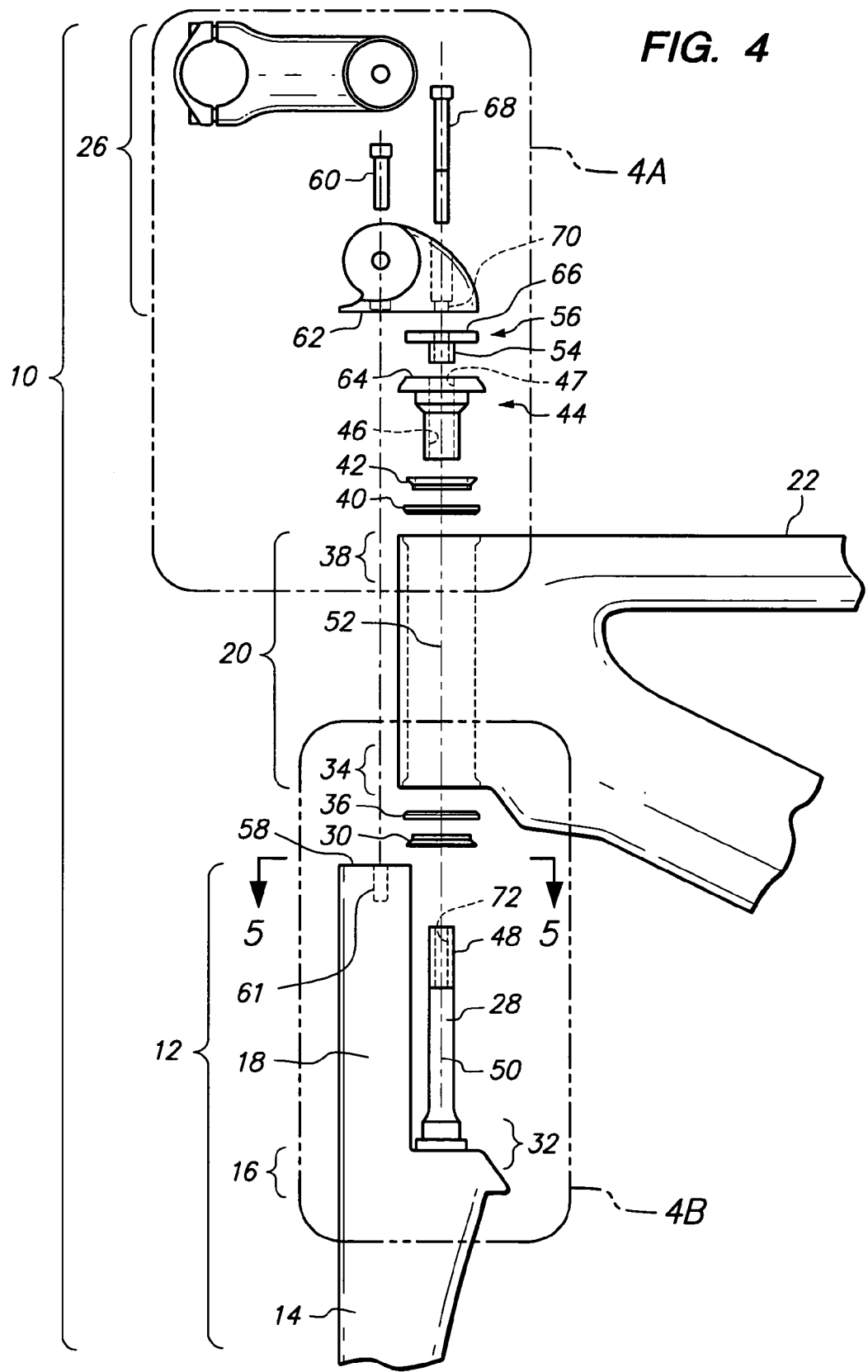
FIG. 4 is an exploded side of the bicycle shown in FIG. 3.

FIG. 4 is a side exploded view of the front end of the bicycle 10. The fork 12 may have the fork head 18, axis shaft 28, fork crown 16 and fork legs 14. The fork legs 14 are joined together at the fork crown 16. The axis shaft 28 may be attached to the fork crown 16. The fork head 18 may also be attached to the fork crown 16 and be positioned in front of the axis shaft 28. A fork crown race 30 is disposable at the base 32 of the axis shaft 28 (see FIGS. 4 and 4B) or may be formed as a unitary structure with the base 32 of the axis shaft 28. FIG. 4 illustrates a separate fork crown race 30 disposable at the base 32 of the axis shaft 28. To install the fork 12 onto the head tube 20 of the bicycle frame 22, a lower cup 34 for a lower bearing 36 is disposed at or formed as a unitary structure of the lower end portion of the head tube 20 (see FIGS. 4 and 4B). FIG. 4 illustrates the lower cup 34 as a unitary structure with the upper end portion of the head tube 20. The fork crown race 30 is disposed on the base 32 of the axis shaft 28. The lower bearing 36 is then placed on the fork crown race 30 and about the axis shaft 28. The axis shaft 28 is then inserted into the head tube 20. The fork crown race 30 and the lower cup 34 receive the lower bearing 36.

Figure 4A:
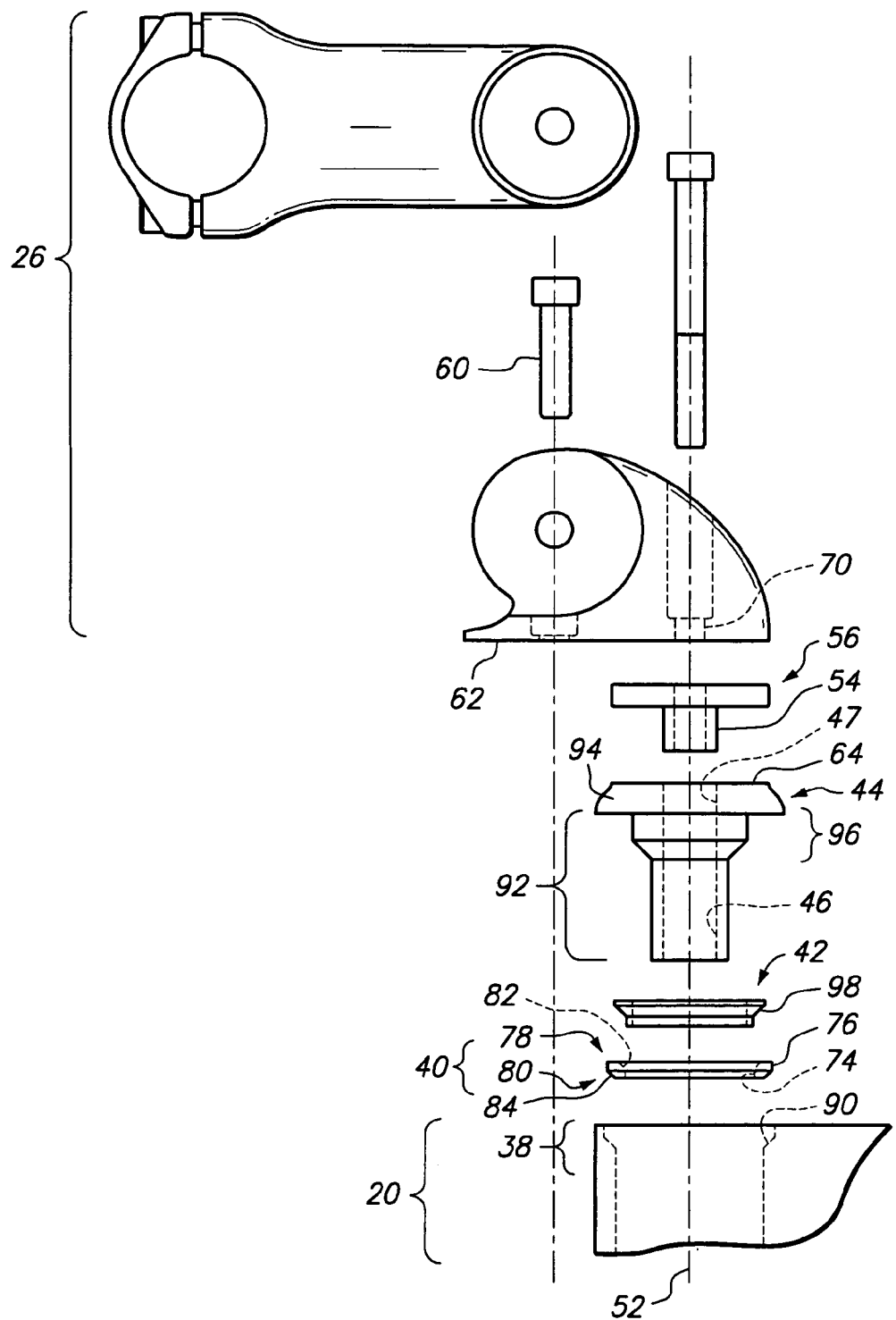
FIG. 4A is an enlarged view of an upper portion of the bicycle shown in FIG. 4.

Thereafter, an upper cup 38 for an upper bearing 40 is disposed at or formed as a unitary structure of the upper end portion of the head tube 20 (see FIGS. 4 and 4A). FIG. 4 illustrates the upper cup 38 as a unitary structure with the upper end portion of the head tube 20. A corresponding upper cone 42 is disposed at (see FIGS. 4 and 4A) or formed as a unitary structure of the bottom side of a headset cap 44. FIG. 4 illustrates the upper cone 42 as a separate part of the headset cap 44. The upper bearing 40 is inserted into the upper cup 38 and lower internal threads 46 (see FIGS. 4 and 4A) of the headset cap 44 is threaded onto external threads 48 of the axis shaft 28 at its upper distal portion. After the upper and lower bearings 40, 36 are mounted to the head tube 20 of the bicycle frame 22, the headset cap 44 is tightened onto the axis shaft 28 thereby pre-loading the upper arid lower bearings 40, 36. As will be discussed further below, when the appropriate amount of pressure is applied to the bicycle front end, a fork rotational axis 50 (see FIG. 4) defined by the axis shaft 28 becomes aligned to a central axis 52 (see FIG. 4) of the head tube 20 of the bicycle frame 22, the fork 12 does not wobble and the fork 12 freely rotates about the head tube 20.

After the fork 12, bearings 36, 40, and headset cap 44 are assembled, as discussed above, the upper 40 and lower bearings 36 are preloaded by tightening the headset cap 44 to the axis shaft 28 until the fork 12 does not wobble, the fork rotational axis 50 (defined by the axis shaft 28) is aligned to the central axis 52 of the head tube 20 of the bicycle frame 22, and the fork 12 and fork head 18 are able to freely rotate relative to the bicycle frame 22. The head set locking screw 68 (discussed below), pin 110 (discussed below) or other mechanism may be used to fix the position of the headset cap 44 to the axis shaft such that the headset cap 44 does not become loose while the rider is riding the bicycle 10. The fork 12 is now properly mounted to the bicycle frame 22.

Figure 5:
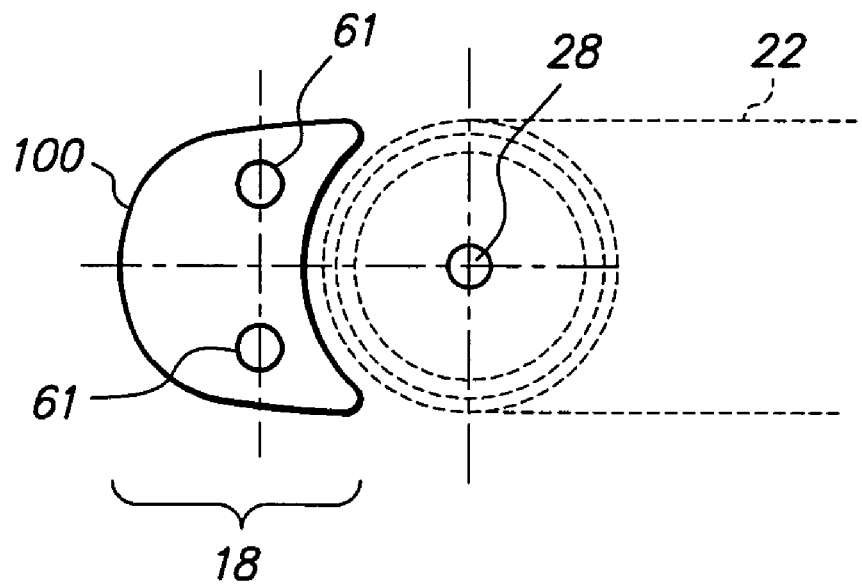
FIG. 5 is a top view of the fork head shown in FIG. 4.

Referring to FIGS. 4 and 4A, to mount the handlebar, external threads 54 of a steerer length compensator 56 may be threaded onto upper internal threads 47 of the headset cap 44 until the steerer length compensator 56 bottoms out on (i.e., touches) top of the headset cap 44. The handlebar mount 26 may then be attached to the fork head 18 at a top end thereof via one or more screws 60 received into threaded holes 61 (see FIG. 4) at the top end of the fork head 18. The threaded holes 61 for the screws 60 are best shown in FIGS. 4 and 5. After the handlebar mount 26 is attached to the fork head 18, a gap 63 (see FIG. 3) may exist between the bottom surface 62 of the handlebar mount 26 and the top surface 64 of the headset cap 44. The steerer length compensator 56 is raised from the headset cap 44 until a top surface 66 of the steerer length compensator 56 contacts the bottom surface 62 of the handlebar mount 26. A headset locking screw 68 may be inserted through an aperture 70 (see FIGS. 4 and 4A) formed through the handlebar mount 26 and secured to internal threads 72 formed at the upper portion of the axis shaft 28. The headset locking screw 68 compresses the axis shaft 28 to the headset cap 44 thereby locking the position of the headset cap 44 with respect to the axis shaft 28. This fixes the preload force applied to the upper 40 and lower bearings 36 such that the front end assembly does not become loose while the rider is riding the bicycle 10.

The upper and lower bearings 40, 36 may be standard bearings or integrated headset bearings sold by TH Industries, Part No. 1" ACB 36×45 373. Each of the bearings 40, 36 may provide rotational movement between an inner race 74 and an outer race 76 (see FIGS. 4A and 4B). Each of the bearings 40, 36 may define a first end portion 78 and a second end portion 80. The first end portion 78 may have an internal beveled surface 82 (see FIG. 4A) formed as part of the inner race 74.

The second end portion 80 of the bearing may have an external beveled surface 84 (see FIG. 4A) formed as part of the outer race 76. Alternatively, the upper and lower bearings 40, 36 may be loose bearings, as discussed herein in relation to FIGS. 7 and 7A.

Figure 4B:
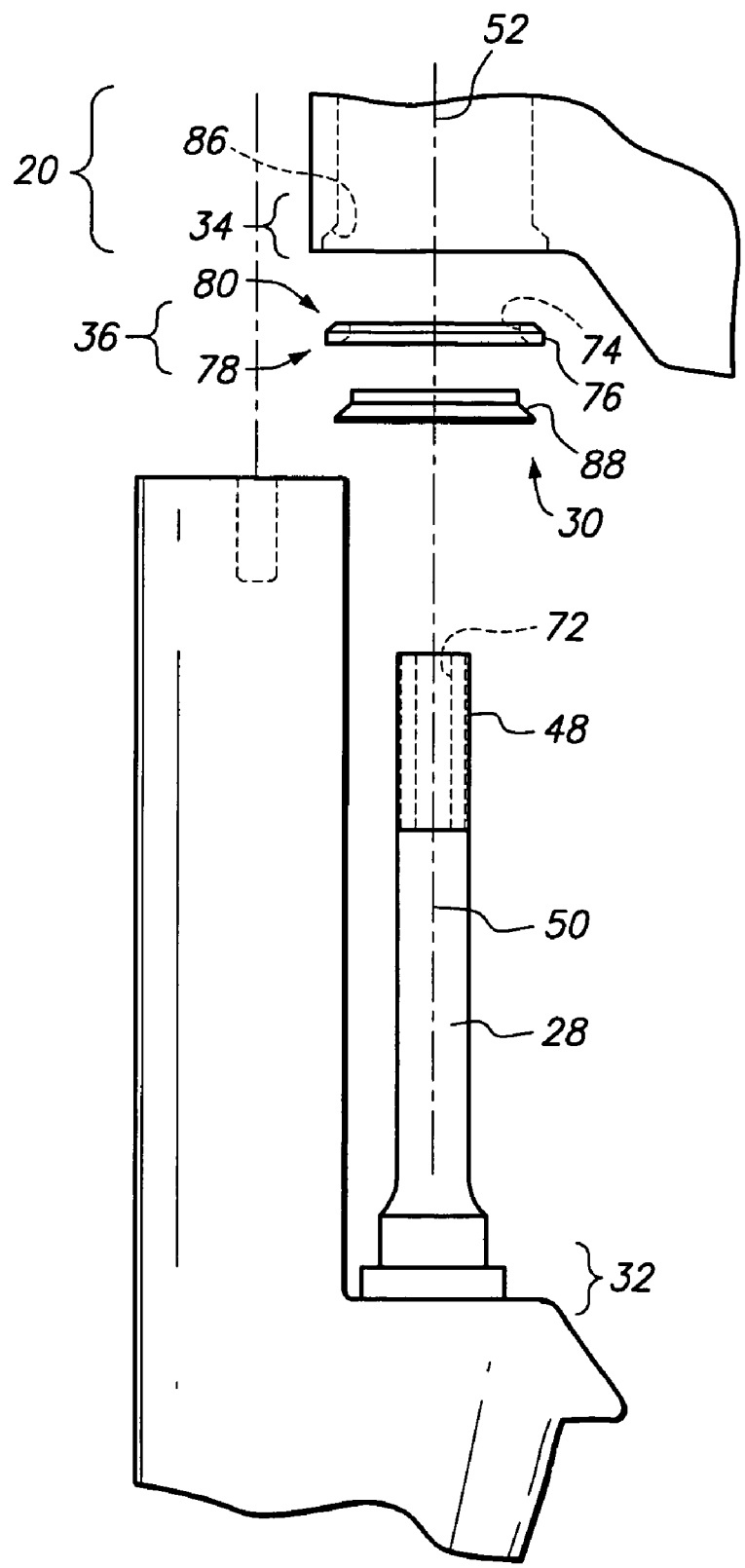
FIG. 4B is an enlarged view of a lower portion of the bicycle shown in FIG. 4.

To install the upper and lower bearings 40, 36 to the upper end portion and lower end portion of the head tube 20, respectively, the second end portions 80 of the upper and lower bearings 40, 36 are inserted into the head tube 20. In particular, the lower end portion of the head tube 20 may be integrally formed as a lower cup 34, as shown in FIGS. 4 and 4B. The lower cup 34 may have a mating beveled surface 86 (see FIG. 4B) which mates with the external beveled surface 84 of the second end portion of the lower bearing 36. The lower bearing 36 is then inserted into the lower end portion of the head tube 20 (i.e., lower cup 34) with the second end portion 80 being inserted first. The external beveled surface 84 of the lower bearing 36 then contacts the mating beveled surface 86 (see FIG. 4B) formed in the lower cup 34 of the lower end portion of the head tube 20.

A fork crown race 30 may be disposed at the base 32 of the axis shaft 28 and may receive the lower bearing 36. The fork crown race 30 may have a mating beveled surface 88 which mates with the internal beveled surface 82 of the first end portion 78 of the lower bearing 36. The axis shaft 28 is then inserted through the head tube 20 until the lower bearing 36 is seated between the lower cup 34 formed in the lower end portion of the head tube 20 and the fork crown race 30. Due to the mating beveled surfaces 86, 84 of the lower cup 34 and the lower bearing 36, the lower bearing 36 is centrally aligned to the central axis 52 of the head tube 20. Furthermore, due to the internal beveled surface 82 of the lower bearing 36 and the mating beveled surface 88 of the fork crown race 30, the fork crown race 30 and the base 32 of the axis shaft 28 are centered to the central axis 52 of the head tube 20.

The upper bearing 40 is disposed within the upper end portion of the head tube 20 in a similar manner compared to the lower bearing 36. In particular, the upper end portion of the head tube 20 may be integrally formed with an upper cup 38, as shown in FIGS. 4 and 4A. An internal beveled surface 90 (see FIG. 4A) may be formed in the upper cup 38. The upper bearing 40 may be inserted into the upper cup 38 with the second end portion 80 of the bearing being inserted first. The external beveled surface 84 of the second end portion 80 of the upper bearing 40 may mate with the beveled surface 90 of the upper cup 38. Such mating contact centers the upper bearing 40 with respect to the central axis 52 of the head tube 20. Thereafter, the headset cap 44 may be attached to the axis shaft 28. In particular, the headset cap 44 may have an elongate post 92 (see FIG. 4A) having lower internal threads 46. The upper distal end portion of the axis shaft 28 may have mating external threads 48. The lower internal threads 46 of the elongate post 92 may be threaded onto the external threads 48 of the axis shaft 28. The headset cap 44 may additionally have a radially outward extending flange 94 (see FIG. 4A) having an outer diameter greater than an inner diameter of the upper bearing 40 but is preferably greater than an outer diameter of the upper bearing 40. As the headset cap 44 is tightened onto the axis shaft 28, the radially outward extending flange 94 presses down on the first end portion 78 of the upper bearing 40. Also, the fork crown 16 is pulled upward to attach the fork 12 to the head tube 20 of the bicycle frame 22.

The lower surface of the headset cap may 44 be integrally formed as an upper cone 42. Alternatively, as shown in FIGS. 4 and 4A, a separate upper cone 42 may be disposed at a base 96 (see FIG. 4A) of the elongate post 92 and adjacent to the lower surface of the headset cap 44. The upper cone 42 may be sized and configured to receive the first end portion 78 of the upper bearing 40. In particular, the upper cone 42 may have a mating beveled surface 98 sized and configured to mate with the internal beveled surface 82 of the upper bearing 40. The beveled surfaces 98, 82, 84, 90 of the upper cone 42, the upper bearing 40 and the upper cup 38 align the axis shaft 28 (i.e., fork rotational axis 50) to the central axis 52 of the head tube 20.

As the headset cap 44 is tightened onto the axis shaft 28, the fork crown 16 and the outwardly extending flange 94 of the headset cap 44 compresses the upper bearing 40, head tube 20 and lower bearing 36 together. The beveled surfaces 82, 84, 86, 88, 90 align the fork rotational axis 50 (i.e., the central axis 52 of the axis shaft 28) to the central axis 52 of the head tube 20. To properly assemble the fork 12 to the head tube 20, the headset cap 44 is tightened onto the axis shaft 28 until the fork 12 does not wobble and the fork 12 is able to freely rotate. By way of example and not limitation, the headset cap 44 may be tightened onto the axis shaft 28 until the fork 12 does not freely rotate. At this point, the fork 12 does not wobble and the axis shaft 28 is aligned to the central axis 52 of the head tube 20 but at the same time, the fork 12 is unable to freely rotate for normal use. Thereafter, the headset cap 44 may be slightly loosened until the fork 12 is able to freely rotate. At this point, the fork 12 does not wobble and yet the fork 12 is able to freely rotate about the fork rotational axis 50.

Figure 5A:
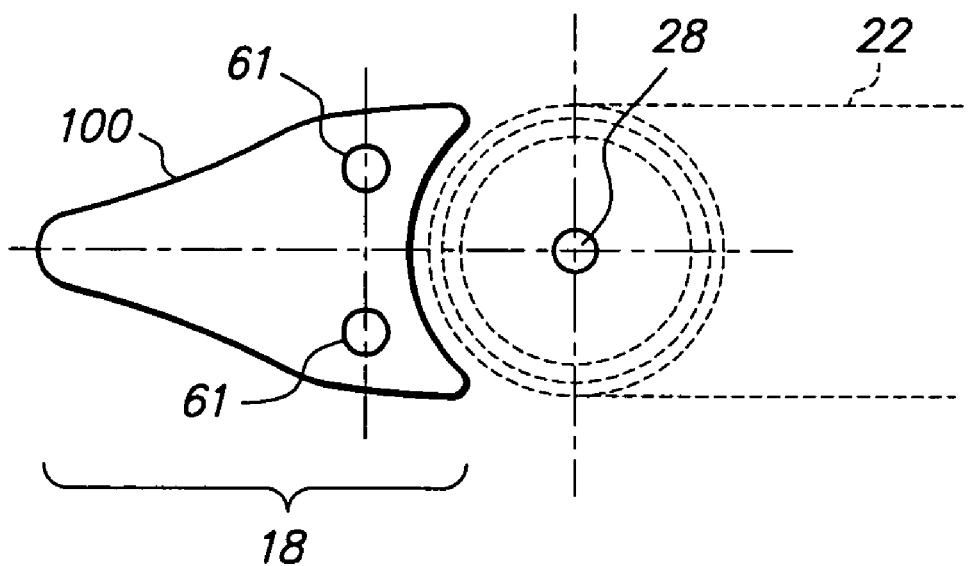
FIG. 5A is an alternate embodiment of the fork headshown in FIG. 5.

Referring now to FIG. 5, a cross sectional top view of the fork head 18 of FIG. 4 is shown. The fork head 18 may define a front surface 100. The front surface 100 may have a variety of different shapes for reducing the drag of the bicycle 10. By way of example and not limitation, the front surface 100 of the fork head 18 may have a rounded configuration, as shown in FIG. 5. Alternatively, the front surface 100 may have a V shaped configuration, as shown in FIG. 5A. Other configurations are also contemplated such as parabolic or half-body configuration so long as the fork head 18 is sufficiently stiff and strong to support the handlebar/handlebar mount 26 and to efficiently slice through air to reduce drag. The fork head 18 rotates about the head tube 20 according to the steering of the bicycle.

Figure 6:
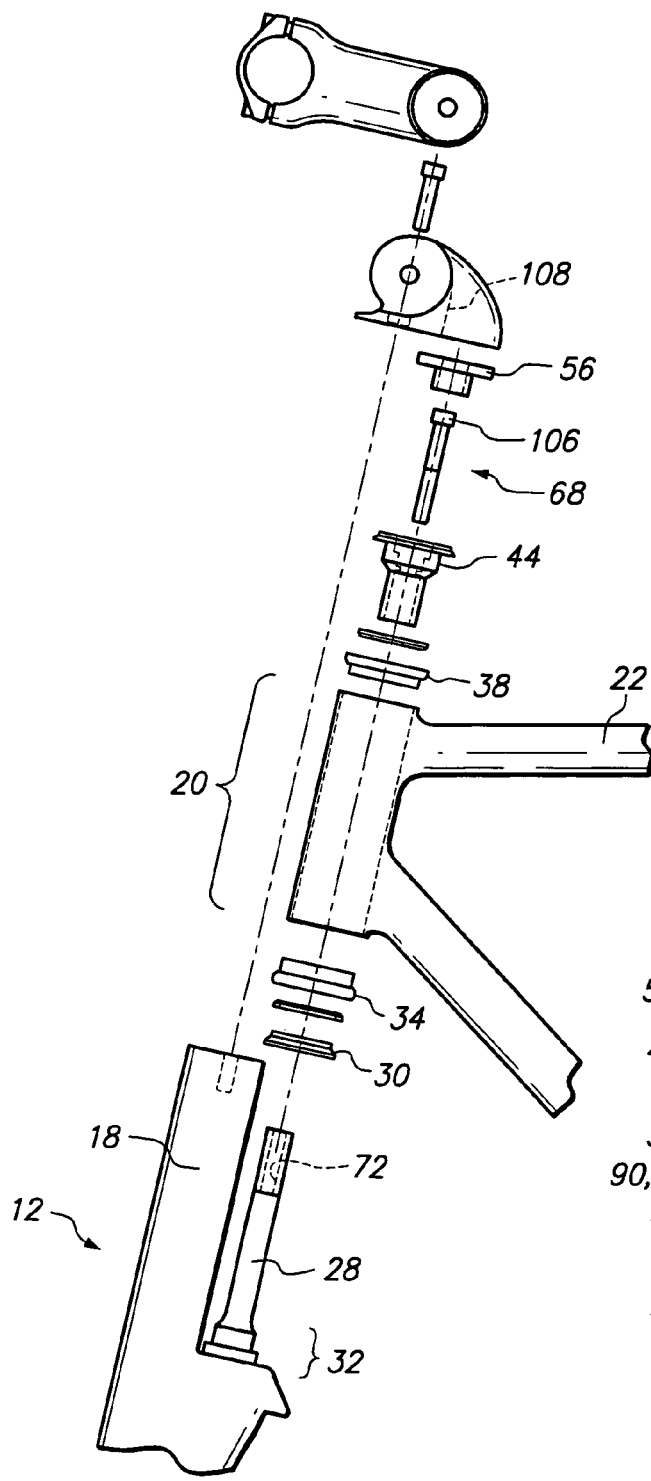
FIG. 6 is an exploded view of a fork with fork head sized and configured to mount onto a bicycle frame designed for a threadless headset wherein an axis shaft of the fork with fork head mounts to a head tube of the bicycle frame and a handlebar mounts to the fork head.
Figure 6A:
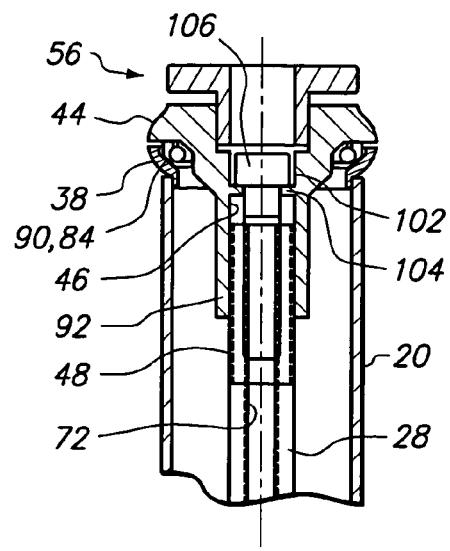
FIG. 6A is a cross sectional assembled view of the upper end portion of the head tube shown in FIG. 6A.

In an alternative embodiment, the beveled surfaces 86, 90 formed in the upper 38 and lower cups 34 may be formed in separate upper and lower 38, 34 cups as shown in FIGS. 6 and 6A. For example, separate upper cup 38 sized and configured to be received into the upper end portion of the head tube 20 may be fabricated. The upper cup 38 may have an internal beveled surface 90 (see FIG. 6A) which mates with the external beveled surface 84 of the second end portion 80 of the upper bearing 40. Similarly, a separate lower cup 34 sized and configured to be received into the lower end portion of the head tube 20 may be fabricated. The lower cup 34 may have an internal beveled surface 86 which mates with the external beveled surface 84 of the second end portion 80 of the lower bearing 36. The fork 12 may be assembled onto the head tube 20 via the steps discussed above. In particular, a fork crown race 30 may be disposed at the base 32 of the axis shaft 28. The axis shaft 28 may be inserted into the head tube 20 with the separate lower cup 34 disposed at the lower end portion of the head tube 20 and the lower bearing 36 disposed between the lower cup 34 and the fork crown race 30. Thereafter, the separate upper cup 38 may be disposed at the upper end portion of the head tube 20 and the upper bearing 40 disposed in the separate upper cup 38. The headset cap 44 may then be screwed onto the axis shaft 28 and tightened such that the fork 12 does not wobble but yet is able to freely rotate.

In the various embodiments discussed herein, the fork crown race 30 may be formed as a unitary structure with the axis shaft 28 or the fork crown 16. Alternatively, the fork crown race 30 may be formed as a separate structure, as shown in FIGS. 4, 4B and 6. The separate fork crown race 30 may have a split ring configuration. An inner diameter of the separate fork crown race 30 may be slightly smaller compared to an outer diameter of the base 32 of the axis shaft 28. To install the separate fork crown race 30 at the base 32 of the axis shaft 28, the fork crown race 30 is pressed over the base of the axis shaft 28. The fork crown race 30 may have a beveled surface 88 (see FIG. 4B) which mates with the internal beveled surface of the first end portion 78 of the lower bearing 36.

Similarly, the upper cone 42 may be formed as a unitary structure with the headset cap 44. Alternatively, the upper cone 42 may be formed as a separate structure, as shown in FIGS. 4 and 4A. The separate upper cone 42 may have a split ring configuration. An inner diameter of the separate upper cone 42 may be slightly smaller compared to an outer diameter of the base 96 of the elongate post 92 of the headset cap 44. To install the separate upper cone 42 to the base 96 of the elongate post 92 of the headset cap 44, the separate upper cone 42 is pressed over the base 96 of the elongate post 92. The separate upper cone 42 may have a beveled surface 98 (see FIG. 4A) which mates with the internal beveled surface 82 of the first end portion 78 of the upper bearing 40.

In an alternative embodiment of installing the upper and lower bearings 40, 36, the first end portions 78 of the upper and lower bearings 40, 36 may be inserted into the head tube 20. The upper end portion and lower end portion of the head tube 20 may have beveled surfaces which mate with the internal beveled surfaces 82 of the upper and lower bearings 40, 36. Also, the fork crown race 30 may have a beveled surface which mates with the external beveled surface 84 of the second end portion 90 of the lower bearing 36. Also, the head set cap 44 may have a beveled surface which mates with the external beveled surface 84 of the second end portion 90 of the upper bearing 40. The respective beveled surfaces mate with each other to align the fork rotational axis 50 defined by the axis shaft 28 to the central axis 52 of the head tube 20 such that the fork 12 does not wobble and the fork 12 freely rotates about the head tube 20 when the upper and lower bearings 40, 36 are preloaded.

In the various embodiments and aspects discussed herein, as an alternative embodiment to locking the headset cap 44 to the axis shaft 28 via a headset locking screw 68 inserted into the aperture 70 (see FIGS. 4 and 4A) of the handlebar mount 26, the headset locking screw 68 may be directly locked onto the headset cap 44 and the axis shaft 28, as shown in FIGS. 6 and 6A. In particular, the elongate post 92 of the headset cap 44 may be formed with internal threads 46 formed at a lower distal portion of the elongate post 92. The lower internal threads 46 formed at the lower distal portion of the elongate post 92 may be threadingly engaged to the external threads 48 formed on the upper distal portion of the axis shaft 28. A hex recess 102 may be formed above the lower internal threads 46 of the headset cap 44. A flange 104 in the headset cap 44 may be sized and configured to receive a head 106 of the headset locking screw 68. After the headset cap 44 is threaded onto the axis shaft 28 and the upper and lower bearings 40, 36 properly pre-loaded, the headset locking screw 68 is inserted through the hex recess 102 and threaded into the internal threads 72 at the upper distal portion of the axis shaft 28. The headset locking screw 68 is tightened onto the flange 104 to lock the position of the headset cap 44 to the axis shaft 28. This also locks the pre load on the upper and lower bearings 40, 36 such that the headset cap 44 does not loosen up while the rider is riding the bicycle 10. Thereafter, as an optional component, the steerer length compensator 56 may be threaded onto the headset cap 44 until the steerer length compensator 56 is bottomed out on the headset cap 44. The handlebar mount 26 may be attached to the fork head 18, as discussed above. After the handlebar mount 26 is attached to the fork head 18, the steerer length compensator 56 may be adjusted upward to eliminate any gap between the handlebar mount 26 and the headset cap 44. Alternatively, a skirt may be mounted to the handlebar mount and/or the headset cap for covering the gap 63 between the bottom surface of the handlebar mount and the top surface of the headset cap.

Figure 9:
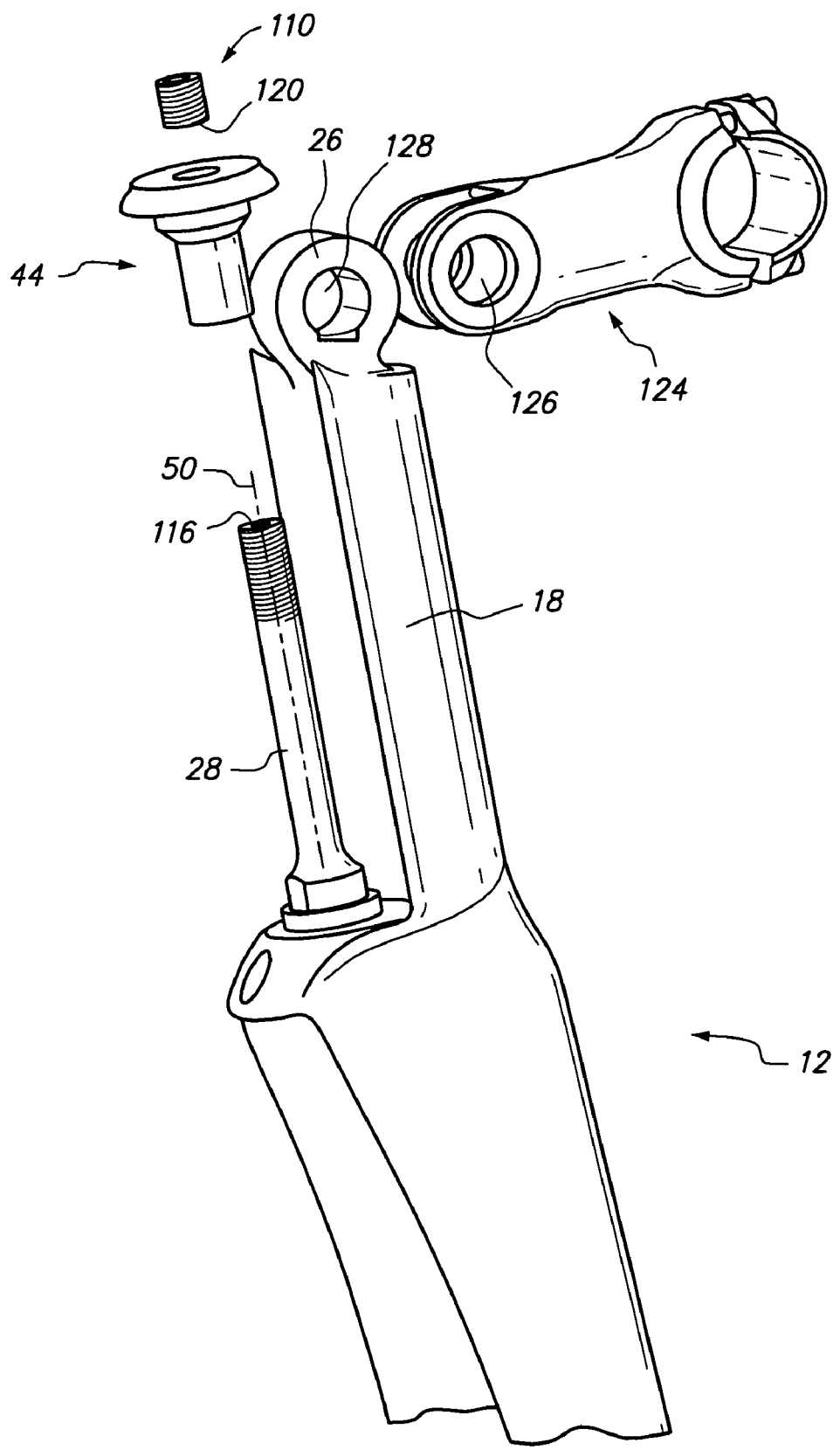
FIG. 9 is side perspective view of a fork with a handlebar mount fabricated from a unitary material with a fork head and a handlebar stem removeably attachable to the handlebar mount.

Alternatively, it is contemplated that the handlebar mount 26 may be shortened such that the handlebar mount 26 does not extend over the head tube 20 as shown by the dashed lines 108 in FIG. 6. In this alternative embodiment, the steerer length compensator may be eliminated and a cap may be disposed over the headset cap 44 for aesthetic purposes. Moreover, as shown in FIG. 9, the handlebar mount 26 may be fabricated as a unitary member with the fork head 18. The fork 12 may be mounted to the head tube 20 solely via attachment with the axis shaft 28. To mount the fork 12 to the head tube 20 of the bicycle 10, the axis shaft 28 is inserted through the head tube 20. The lower bearing 36 is disposed between the lower end portion of the head tube 20 and a fork crown race 30. The upper bearing 40 is disposed between the upper end portion of the head tube 20 and the head set cap 44. The head set cap 44 is tightened onto the axis shaft 28. As the head set cap 44 is tightened onto the axis shaft 28, the upper and lower bearings 40, 36 are preloaded and the fork rotational axis 50 defined by the axis shaft 28 is aligned to the central axis 52 of the head tube 20 such that the fork 12 does not wobble and the fork 12 freely rotates about the head tube 20. To lock the preload of the upper and lower bearings 40, 36, the threaded pin 110 may be threaded into the upper internal threads 47 of the head set cap 44. The threaded pin 110 is further threaded into the upper internal threads 47 and possibly into the lower internal threads 46 until the bottom surface 120 of the threaded pin 110 contacts a top distal end 116 of the axis shaft. The threaded pin 110 is cinched onto the axis shaft 28 to hold the preload force on the upper and lower bearings 40, 36. A handlebar stem 124 may be attached to the handlebar mount 26 by aligning apertures 124, 126 of the handlebar mount 26 and the handlebar stem 124, inserting a bolt through the aligned apertures 124, 126, threading a nut onto the bolt, tightening the nut and bolt to lock the angular position of the handlebar stem 124.

Figure 7:
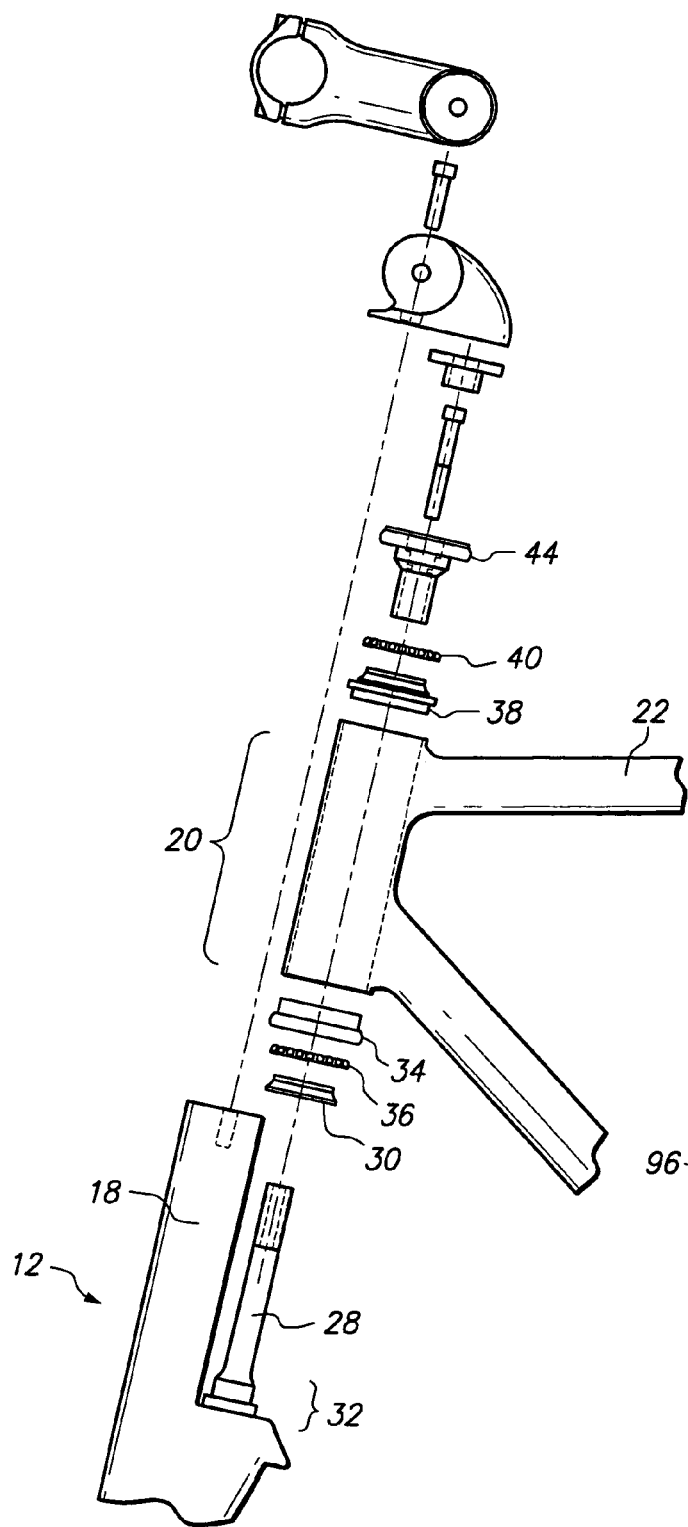
FIG. 7 is an exploded view of a fork with fork head sized and configured to mount onto a bicycle frame designed for a threaded headset wherein an axis shaft of the fork with fork head mounts to a head tube of the bicycle frame and a handlebar mounted to the fork head.

In an aspect of the bicycle front end assembly, the fork 12 with fork head 18 may be installed on a conventional bicycle, non-conventional bicycle, a bicycle having a threadless headset (see FIG. 6) or a bicycle having threaded headset (see FIG. 7). The fork 12 with fork head 18 may be installed on any bicycle frame with a head tube 20. In particular, a separate lower cup 34 and a separate upper cup 38 may be respectively formed to be receivable into the lower and upper end portions of the head tube 20. The separate lower 34 and upper cups 38 may be sized and configured to respectively receive the upper 40 and lower bearings 36.

Figure 7A:
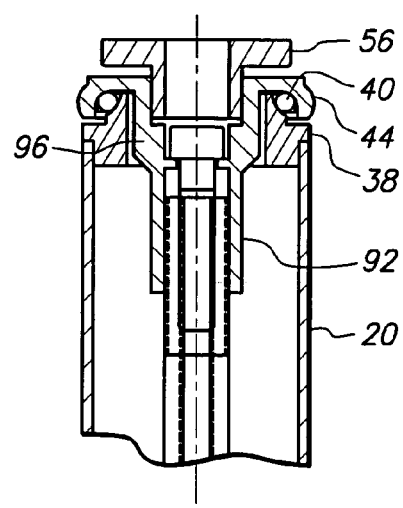
FIG. 7A is a cross sectional assembled view of the upper end portion of the head tube shown in FIG. 7.

Alternatively, the existing upper 40 and lower bearings 36 of the bicycle head tube 20 may be used. By way of example and not limitation, the existing upper and lower bearings 40, 36 may be loose bearings, as shown in FIGS. 7 and 7A. In this case, the lower cup 34 disposed at the lower end portion of the head tube 20 receives the lower bearing 36. A fork crown race 30 sized and configured to receive the lower bearings 36 may be formed as a unitary structure with the base 32 of the axis shaft 28 or formed as a separate structure and disposed at the base 32 of the axis shaft 28 (see FIG. 7). The fork crown race 30 and the lower cup 34 receive the lower bearing 36. The upper cup 38 disposed at the upper end portion of the head tube 20 receives the upper bearing 40. An upper cone 42 sized and configured to receive the bearing may be formed as a unitary structure with the base 96 of the elongate post 92 of the headset cap 44 (as shown in FIGS. 7 and 7A) or formed as a separate structure and disposed at the base 96 of the elongate post 92 of the headset cap 44. To mount the fork 12 to the head tube 20, the axis shaft 28 is inserted into the head tube 20 with the lower bearing 36 disposed between the fork crown race 30 and the lower cup 34. The headset cap 44 is screwed onto the distal end portion of the axis shaft 28 with the upper bearing 40 disposed between the separate upper cup 38 and the integrally formed upper cone 42. The headset cap is tightened onto the axis shaft until the upper and lower bearings are properly preloaded such that the fork does not wobble, the fork rotational axis and central axis of the head tube are aligned and the fork is able to freely rotate about the head tube.

In an aspect of the bicycle front end assembly, it is contemplated that the fork crown race 30 and the upper cone 42 are optional parts. The base 32 of the axis shaft 28 may be sized and configured to receive a sealed cartridge bearing. In particular, the internal surface of the sealed cartridge bearing may be fitted to the external surface of the axis shaft base 28. Similarly, the base 96 of the elongate portion 92 of the headset cap 44 may be sized and configured to receive a sealed cartridge bearing. The internal surface of the sealed cartridge bearing may be fitted to the external surface of the base 96 of the elongate portion 92 of the headset cap 44. The fit between the bearings and bases of the elongate post 92 and axis shaft 28 may be sufficient to center the upper 40 and lower bearings 36.

In the various embodiments discussed herein, the headset cap 44 may be tightened onto the axis shaft 28 or loosened off of the axis shaft 28 via a tool interface (e.g., hex recess 102 as discussed above in relation to FIG. 6A). Additionally, the steerer length compensator 56 may be screwed into or loosened off of the headset cap 44 with the aid of ridges and/or indentations formed about an outer periphery of an upper flange of the steerer length compensator 56. Moreover, the bicycle frame 22 and the various components discussed herein may be fabricated from fiber composite material, carbon fiber, aluminum, steel or other material used for bicycles.

In an aspect of the embodiments discussed herein, the axis shaft 28 above the base 32 may have an outer diameter as required to provide sufficient support to withstand stresses due to riding over bumps, turning, etc. or other maneuvering of the bicycle. By way of example and not limitation, the outer diameter of the axis shaft above the base may be greater than one inch or less than one inch. Preferably, the outer diameter of the axis shaft above the base is less than one inch, as is currently shown in the figures. In this manner, the front profile of the head tube may be minimized so as to reduce the drag coefficient of the bicycle. Nonetheless, if the embodiments shown in FIGS. 4, 6 and 7 incorporate an axis shaft having an outer diameter above the base greater than or equal to one inch, then the bicycle components discussed herein may resized and configured to fit such axis shaft.

In another aspect of the embodiments discussed herein, when the upper and lower ends of the head tube is described as being sized and configured to respectively receive the upper and lower bearings, it is contemplated that the upper and lower cups are either separately or unitarily formed with the head tube, as discussed herein, and/or it is also contemplated that upper and lower cones may be separately or unitarily formed with the head tube.

In another aspect of the embodiments discussed herein, the handlebar mount is shown with a stem that is rotateable as shown by arrow 122 (see FIG. 3). However, the handlebar mount may be fixed stem which is not rotateable. As such, the handlebar mount should not be limited to only rotateable stems.

Figure 8:
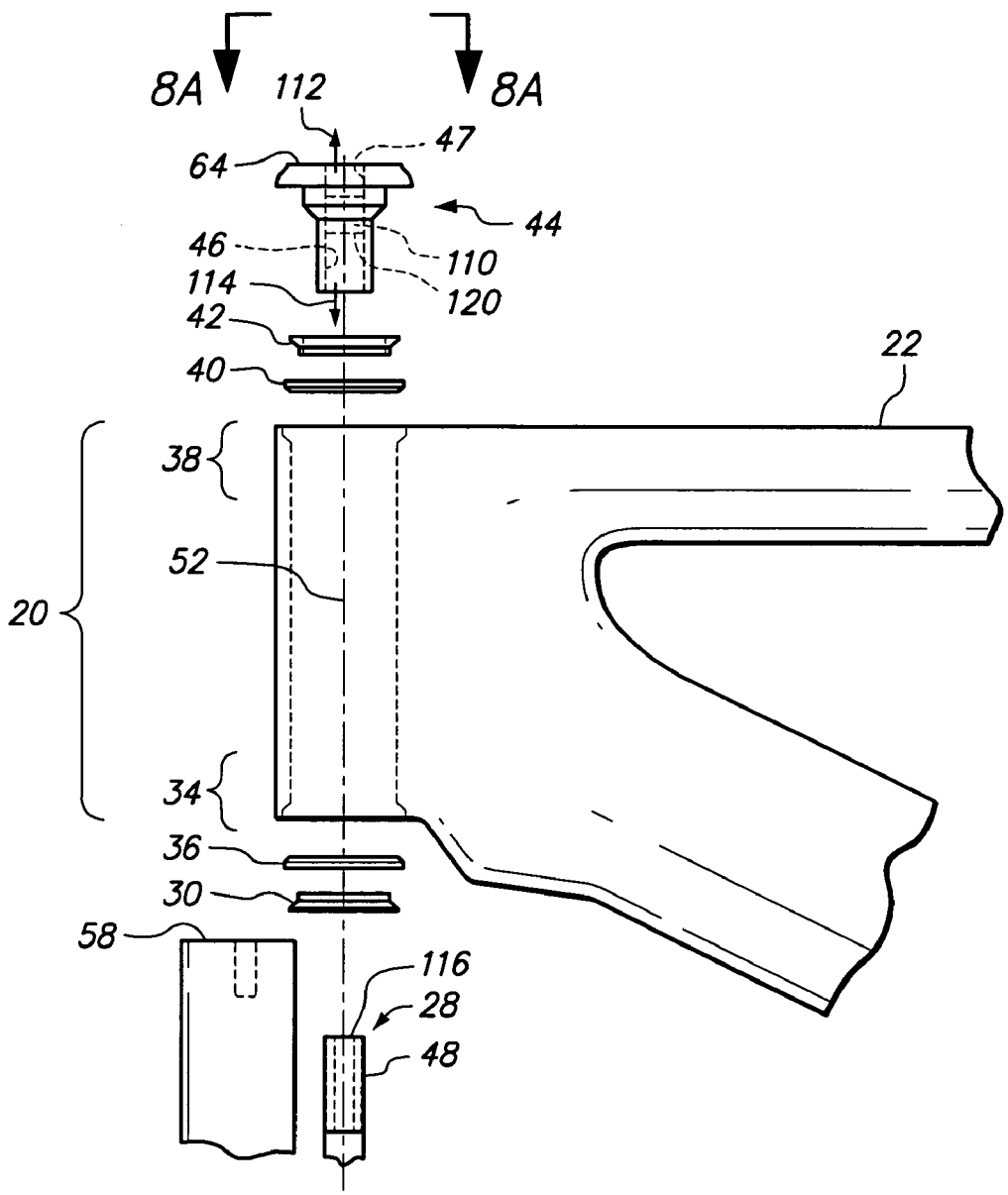
FIG. 8 is an enlarged side view of the bicycle illustrating an alternate embodiment of the headset being locked onto the axis shaft.
Figure 8A:
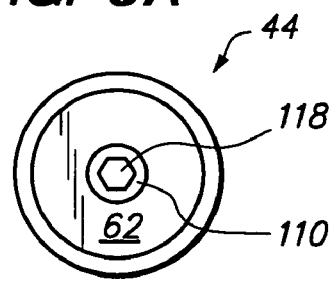
FIG. 8A is a top view of the headset cap.

Referring now to FIGS. 8 and 8A, in an aspect of the bicycle 10, the headset cap 44 may be fixed to the axis shaft 28 via a threaded pin 110 that may be threaded downward or upward through the headset cap 44 as shown by up and down arrows 112, 114.

The outer surface of the pin 110 may be threaded. Also, the upper and lower threads 47, 46 may be threaded. The upper and lower threads 46, 47 may be integrally formed with each other such that the pin 110 can be traversed upward into engagement with the upper threads 47 by rotating the pin 110 or the pin 110 can be traversed downward into engagement with the lower threads 46 by rotating the pin 110.

To mount the fork 12 to the head tube 20 of the bicycle frame 22, the upper and lower bearings 40, 36 may be preloaded as discussed above by tightening down the headset cap 44 onto the axis shaft 28. Once the upper and lower bearings 40, 36 are properly pre loaded, the headset cap 44 should be fixed to the axis shaft 28 such that the headset cap 44 does not become loose while the rider is riding the bicycle 10.

As discussed above, the headset locking screw 68 fixes the headset cap 44 to the axis shaft 28. As an alternate means of fixing the headset cap 44 to the axis shaft 28, the pin 110 may have external threads. The external threads of the pin 110 are threadably engageable to the upper and lower internal threads 47, 46 of the headset cap 44. The pin 110 is initially disposed adjacent the upper internal threads 47. The reason is that the lower internal threads 46 of the headset cap 44 are threaded onto the external threads 48 of the axis shaft 28. The pin 110 should not contact the top distal end 116 of the axis shaft 28 when the upper and lower bearings 40, 36 are being pre loaded. After the upper and lower bearings 40, 36 are pre loaded, the pin 110 is rotated clockwise to traverse the pin 110 into engagement with the top distal end 116 of the axis shaft 28. The pin 110 may be formed with a hex recess 118 (see FIG. 8A). An allen wrench may be inserted into the hex recess 118 and rotated clockwise. It is contemplated that the pin 110 may be rotated via other methods. The recess 118 may have a star configuration, and a corresponding wrench with a star configured distal tip may be used to rotate the pin 110. When the wrench is rotated in the clockwise direction, the pin 110 is also rotated in the clockwise direction and traversed toward the distal top end 116 of the axis shaft 28. When a bottom surface 120 of the pin 110 contacts the top distal end 116 of the axis shaft 28, the user may synch the pin 110 onto the axis shaft 28 thereby fixing the position of the headset cap 44 to the axis shaft 28. In this manner, the headset cap 44 will not become loose while the rider is riding the bicycle 10.

The allen wrench is provided by way of example and not limitation. Other means could be employed. Generally, a tool interface may be formed on the pin. A tool may then be used to turn the pin to traverse the pin up or down in the headset cap.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A competition bicycle comprising:
   a frame including a head steering end portion, the head steering end portion defining a central axis, a lower portion and an upper portion;
   a lower bearing;
   an upper bearing;
   a fork including fork legs joined at an upper portion defining a fork crown, the fork also including a fork head and axis shaft attached to the fork crown, the axis shaft having internal and external threads and defining a rotational axis of the fork, the lower bearing disposed between the fork crown and the lower portion of the head steering end portion, the fork head extending in front of the head steering end portion when the axis shaft is inserted into the head steering end portion;
   a headset cap with the upper bearing disposed between the headset cap and the upper portion of the head steering end portion, the headset cap being threadably engaged to the external threads of the axis shaft and having a hole aligned to the internal threads, the upper and lower bearings being under an axial load between the headset cap and the fork crown for preloading the upper and lower bearings to align the rotational axis of the fork to the central axis of the head steering end portion;
   a handlebar mount having an aperture and a recess, the handlebar mount attached to the fork head; and
   a headset locking screw disposed through the hole of the headset cap and threadably engaged to the internal threads of the axis shaft with a head of the headset locking screw disposed within the recess of the handlebar mount, the headset locking screw insertable through the aperture of the handlebar mount for adjusting engagement of the headset locking screw to the axis shaft, a head of the headset locking screw being disposed within the recess of the handlebar mount for promoting laminar flow of air about the handlebar mount;
   a height compensator disposed between the handlebar mount and the headset cap and threadably engageable with the headset cap to support a load of the handlebar mount.

2. The bicycle of claim 1 wherein the compensator eliminates a gap between the headset cap and the handle bar mount to support the load of the handlebar mount.

3. The bicycle of claim 1 wherein the handle bar is directly attached only to the fork head.

4. The bicycle of claim 1 wherein the lower portion of the head steering end portion is sized and configured to receive the lower bearing in that the lower portion of the head steering end portion is integrally formed as a lower cup.

5. The bicycle of claim 1 wherein the upper portion of the head steering end portion is sized and configured to receive the upper bearing in that the upper portion of the head steering end portion is integrally formed as an upper cup.

6. The bicycle of claim 1 wherein the fork crown race is unitarily formed with a base of the of the axis shaft.

7. The bicycle of claim 1 wherein an upper cone is unitarily formed with a base of an elongate post of the headset cap.

8. The bicycle of claim 1 wherein the lower portion of the head steering end portion is sized and configured to receive lower bearing in that the lower portion of the head steering end portion is sized and configured to receive a separate lower cup.

9. The bicycle of claim 1 wherein the upper portion of the head steering end portion is sized and configured to receive the upper bearing in that the upper portion of the head steering end portion is sized and configured to receive a separate upper cup.

10. The bicycle of claim 1 wherein a separate fork crown race is disposed at a base of the axis shaft.

11. The bicycle of claim 1 wherein a separate upper cone is disposed at a base of an elongate post of the headset cap.

12. The bicycle of claim 1 wherein the head steering end portion is a head tube of the bicycle.

13. The bicycle of claim 1 wherein the frame is fabricated from carbon fiber.

14. The bicycle of claim 1 wherein the upper and lower bearings are angular contact bearings.

15. The bicycle of claim 1 wherein the headset locking screw locks the headset cap to the axis shaft such that the headset cap does not become loose during use.

* * * * *